United States Patent
Myoga et al.

(10) Patent No.: US 10,729,926 B2
(45) Date of Patent: *Aug. 4, 2020

(54) METHOD FOR DETOXIFYING ASBESTOS

(71) Applicants: KOKIGUMI CO., LTD, Nagoya-shi, Aichi (JP); NATIONAL UNIVERSITY CORPORATION TOTTORI UNIVERSITY, Tottori-shi, Tottori (JP)

(72) Inventors: Toshimitsu Myoga, Nagoya (JP); Koichi Takahashi, Nagoya (JP); Kazuhiro Iizuka, Nagoya (JP); Yuhei Matsubara, Tottori (JP); Toshiyuki Tanaka, Yonago (JP); Hisaki Okamoto, Tohaku-gun (JP)

(73) Assignees: KOKIGUMI CO., LTD., Aichi (JP); NATIONAL UNIVERSITY CORPORATION TOTTORI UNIVERSITY, Tottori (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/098,389

(22) PCT Filed: Jul. 6, 2018

(86) PCT No.: PCT/JP2018/025765
§ 371 (c)(1),
(2) Date: Nov. 1, 2018

(87) PCT Pub. No.: WO2019/187181
PCT Pub. Date: Oct. 3, 2019

(65) Prior Publication Data
US 2019/0358480 A1    Nov. 28, 2019

(30) Foreign Application Priority Data
Mar. 28, 2018  (JP) ................. 2018-063058

(51) Int. Cl.
*A62D 3/36*    (2007.01)
*A62D 101/41*  (2007.01)

(52) U.S. Cl.
CPC ............ *A62D 3/36* (2013.01); *A62D 2101/41* (2013.01)

(58) Field of Classification Search
CPC .............................. A62D 3/36; A62D 2101/41
USPC ......................................................... 588/411
See application file for complete search history.

(56) References Cited

U.S. PATENT DOCUMENTS

2010/0048976 A1*    2/2010  Sakamoto ............... A62D 3/33
                                                          588/321

FOREIGN PATENT DOCUMENTS

| JP | 2011-072915 A | 4/2011 |
| JP | 2011-078931 A | 4/2011 |
| WO | 2010/055830 A1 | 5/2010 |

OTHER PUBLICATIONS

Matsushima et al., "Practical Model Experiment of Asbestos Waste Chemical Decomposition using Acid," Journal of the Japan Society of Material Cycles and Waste Management, 2017, vol. 28, pp. 101-113.

* cited by examiner

*Primary Examiner* — Edward M Johnson
(74) *Attorney, Agent, or Firm* — Oliff PLC

(57) ABSTRACT

The method for detoxifying asbestos disclosed here includes: preparing an asbestos-containing substance that contains at least one type of asbestos; preparing an asbestos treatment agent that contains a mineral acid, N-methyl-2-pyrrolidone and a fluoride; and bringing the asbestos-containing substance into contact with the asbestos treatment agent so as to detoxify asbestos in the asbestos-containing substance. Due to this configuration, asbestos in the asbestos-containing substance can be favorably detoxified.

9 Claims, 11 Drawing Sheets

METHOD FOR DETOXIFYING ASBESTOS

TECHNICAL FIELD

The present invention relates to a method for detoxifying asbestos. More specifically, the present invention relates to a method for detoxifying asbestos and a treatment agent used in the method.

The present application claims the benefit of priority based on Japanese Patent Application No. 2018-063058, filed on Mar. 28, 2018, the contents whereof are incorporated in the present description by reference.

BACKGROUND ART

Asbestos has a needle-like crystal structure obtained by serpentine or hornblende transforming into a fibrous form. Examples of such types of asbestos include chrysotile, amosite, crocidolite, anthophyllite, tremolite and actinolite. These types of asbestos exhibit excellent heat resistance and durability and are inexpensive, and were therefore widely used in a variety of technical fields in the past. Specifically, asbestos-containing substances that contain such types of asbestos were used in fillers for slate sheets, water pipes, fireproof covering materials, brake pads, gaskets, heat insulating boards, ropes, packings, acetylene cylinders, and the like.

However, because it has been established that these types of asbestos can be a primary cause of health problems such as pulmonary asbestosis, lung cancer and malignant mesothelioma, new uses have been banned in recent years. In addition, because continued use of asbestos-containing members used in the past involves risks, there is a need to rapidly detoxify asbestos using methods that do not have an adverse effect on humans and the environment.

Methods for treating such types of asbestos include melting by heating to 1500° C. or higher, chemical decomposition by reacting with prescribed asbestos treatment agents, and burial in landfill sites.

One example of such a detoxification method involving chemical decomposition is the method disclosed in Patent Document 1. In the method disclosed in this document, an asbestos-containing waste material is brought into contact with an aqueous solution of a detoxification (an asbestos treatment agent) to which is added a fluoride (a fluoride salt or hydrofluoric acid of an alkali metal, alkaline earth metal or ammonia) and a mineral acid (hydrochloric acid, sulfuric acid, nitric acid, or the like), and applying ultrasonic vibrations while allowing the solution to stand (or while stirring the solution).

In addition, Non-Patent Document 1 discloses another example of a method for detoxifying asbestos using an asbestos treatment agent that contains a mineral acid and a fluoride.

CITATION LIST

Patent Literature

[Patent Document 1] Japanese Patent Application Publication No. 2011-72915

Non-Patent Literature

[Non-Patent Document 1] Journal of the Japan Society of Material Cycles and Waste Management, Vol. 28, pages 101 to 113, 2017

SUMMARY OF INVENTION

Technical Problem

In recent years, there has been a further increase in the amount of asbestos-containing substances requiring detoxification and disposal, and the number of requests to rapidly and reliably detoxify asbestos in such asbestos-containing substances has increased.

The present invention was created in response to these requests, and the purpose of the present invention is to provide a method for detoxifying asbestos in order to more favorably detoxify asbestos in asbestos-containing substances.

Solution to Problem

In order to achieve the objective mentioned above, the present invention provides a method for detoxifying asbestos, which has the following configuration. Moreover, "detoxifying asbestos" in the present invention means breaking down the needle-like crystal structure of at least a part of the asbestos contained in an asbestos-containing substance and altering other structures, in other words, altering the structure so as to cause substantially no health problems to humans.

Moreover, according to the first article of the 99th Ministry of the Environment of Japan public notice of 2006, the property that there is no risk harm to human health or the environment means that asbestos is not detected. Here, "asbestos is not detected" means that asbestos is substantially not detected in cases where a sample is analyzed using an analysis method involving a dispersion dyeing method using a phase contrast microscope and an X-Ray diffraction analysis method using an X-Ray diffraction apparatus, or that asbestos is substantially not detected when using an analysis method involving the use of a transmission electron microscope (TEM).

Therefore, according to the method for detoxifying asbestos disclosed here, it is possible to easily achieve a state in which asbestos is substantially not detected.

The method for detoxifying asbestos disclosed here includes: preparing an asbestos-containing substance that contains at least one type of asbestos; preparing an asbestos treatment agent that contains a mineral acid, N-methyl-2-pyrrolidone and a fluoride; and bringing the asbestos-containing substance into contact with the asbestos treatment agent so as to detoxify asbestos in the asbestos-containing substance.

As a result of a variety of experiments and investigations into achieving the objectives mentioned above, the inventors of the present invention surprisingly found that by using, as an asbestos treatment agent, a mixed liquid containing a mineral acid as an asbestos treatment agent, N-methyl-2-pyrrolidone (NMP) and a fluoride, asbestos could be detoxified more favorably than with conventional asbestos treatment agents. At present, the detailed action mechanism of such an asbestos treatment agent containing a mineral acid and NMP is unclear, but it is surmised that when asbestos and a mixture of a mineral acid and a fluoride react in the presence of the NMP, an asbestos detoxification reaction progresses further.

The method for detoxifying asbestos disclosed here has been developed on the basis of such findings, and by using an asbestos treatment agent containing a mineral acid, NMP and a fluoride, it is possible to detoxify asbestos in asbestos-containing substances more favorably than in the past.

In addition, in another preferred aspect of the method for detoxifying asbestos disclosed here, the asbestos-containing substance contains at least one of amosite and crocidolite.

Amosite is a hornblende form of asbestos and is represented by the formula $Mg_4Fe_3Si_8O_{22}(OH)_2$. In addition, crocidolite, like amosite, is a hornblende form of asbestos and is represented, for example, by the formula $Na_2Fe^{2+}{}_3Fe^{3+}{}_2Si_8O_{22}(OH)_2$. Among a variety of types of asbestos, amosite and crocidolite are difficult to detoxify, but as a result of experiments by the inventors of the present invention, it was confirmed that amosite and crocidolite could be detoxified particularly favorably by using the detoxification method disclosed here.

In another preferred aspect of the method for detoxifying asbestos disclosed here, the mineral acid is sulfuric acid.

Examples of the mineral acid contained in the asbestos treatment agent include sulfuric acid, hydrochloric acid, nitric acid, phosphoric acid, boric acid and fluoric acid. Of these, sulfuric acid can be used particularly favorably due to being inexpensive and exhibiting high reactivity with asbestos.

In another preferred aspect of the method for detoxifying asbestos disclosed here, the asbestos-containing substance is brought into contact with the asbestos treatment agent for a period of at least 1 hour, for example 1 to 2 hours.

By making the period of contact between the asbestos-containing substance and the asbestos treatment agent 1 hour or longer, as in the present aspect, the asbestos-containing substance and the asbestos treatment agent react with each other well and asbestos in the asbestos-containing substance can be more favorably detoxified. In addition, by setting the period of contact to be 2 hours or less, asbestos can be detoxified with good efficiency.

In another preferred aspect of the method for detoxifying asbestos disclosed here, the asbestos treatment agent is heated to a temperature range that is higher than 50° C. and lower than the boiling point of the treatment agent before the asbestos-containing substance is brought into contact with the asbestos treatment agent.

By heating the asbestos treatment agent before carrying out detoxification, as in the present aspect, reactivity between the mineral acid and the asbestos can be improved and the time required for detoxification can be shortened.

In another preferred aspect of the method for detoxifying asbestos disclosed here, the asbestos-containing substance that is brought into contact with the asbestos treatment agent is in the form of a powder.

By forming the asbestos-containing substance into a powder in advance, as in the present aspect, the area of contact between the asbestos-containing substance and the asbestos treatment agent increases, and hence the asbestos-containing substance and the asbestos treatment agent react with each other well, meaning that the asbestos can be more favorably detoxified.

In addition, another aspect of the present invention provides an asbestos treatment agent.

This asbestos treatment agent is used to detoxify asbestos in an asbestos-containing substance that contains at least one type of asbestos. And the asbestos treatment agent contains a mineral acid, N-methyl-2-pyrrolidone and a fluoride.

By using an asbestos treatment agent containing a mineral acid, NMP and a fluoride, as mentioned above, it is possible to detoxify asbestos in asbestos-containing substances more favorably than with a conventional asbestos treatment agent.

In another preferred aspect of the asbestos treatment agent disclosed here, the mineral acid is sulfuric acid.

Because sulfuric acid is inexpensive and exhibits high reactivity with asbestos, as mentioned above, sulfuric acid can be used particularly favorably as the mineral acid in the asbestos treatment agent disclosed here.

In another preferred aspect of the asbestos treatment agent disclosed here, the fluoride is a compound selected from the group consisting of a fluoride salt of ammonia, a fluoride salt of alkali metal, a fluoride salt of alkaline earth metal, a hydrofluoric acid of ammonia, a hydrofluoric acid of alkali metal and a hydrofluoric acid of alkaline earth metal.

The compounds mentioned above can be given as examples of fluorides able to be contained in the asbestos treatment agent disclosed here. By using these compounds, asbestos can be more favorably detoxified. Moreover, among the compounds mentioned above, ammonium fluoride and ammonium hydrogen fluoride can be used particularly favorably.

In another preferred aspect of the asbestos treatment agent disclosed here, the concentration of the fluoride is 5 to 25 wt % when the treatment agent as a whole is taken to be 100 wt %.

By adding a fluoride at such a concentration, asbestos can be more favorably detoxified.

In another preferred aspect of the asbestos treatment agent disclosed here, the concentration of the N-methyl-2-pyrrolidone is 0.1 to 10 wt % when the treatment agent as a whole is taken to be 100 wt %.

Because the asbestos treatment agent disclosed here contains NMP, as mentioned above, it is possible to detoxify asbestos more favorably than with a conventional asbestos treatment agent. Here, the concentration of NMP in the asbestos treatment agent is preferably 0.1 to 10 wt %, and more preferably 1 to 10 wt %, for example 2.5 wt %.

DESCRIPTION OF EMBODIMENTS

Figure 1:
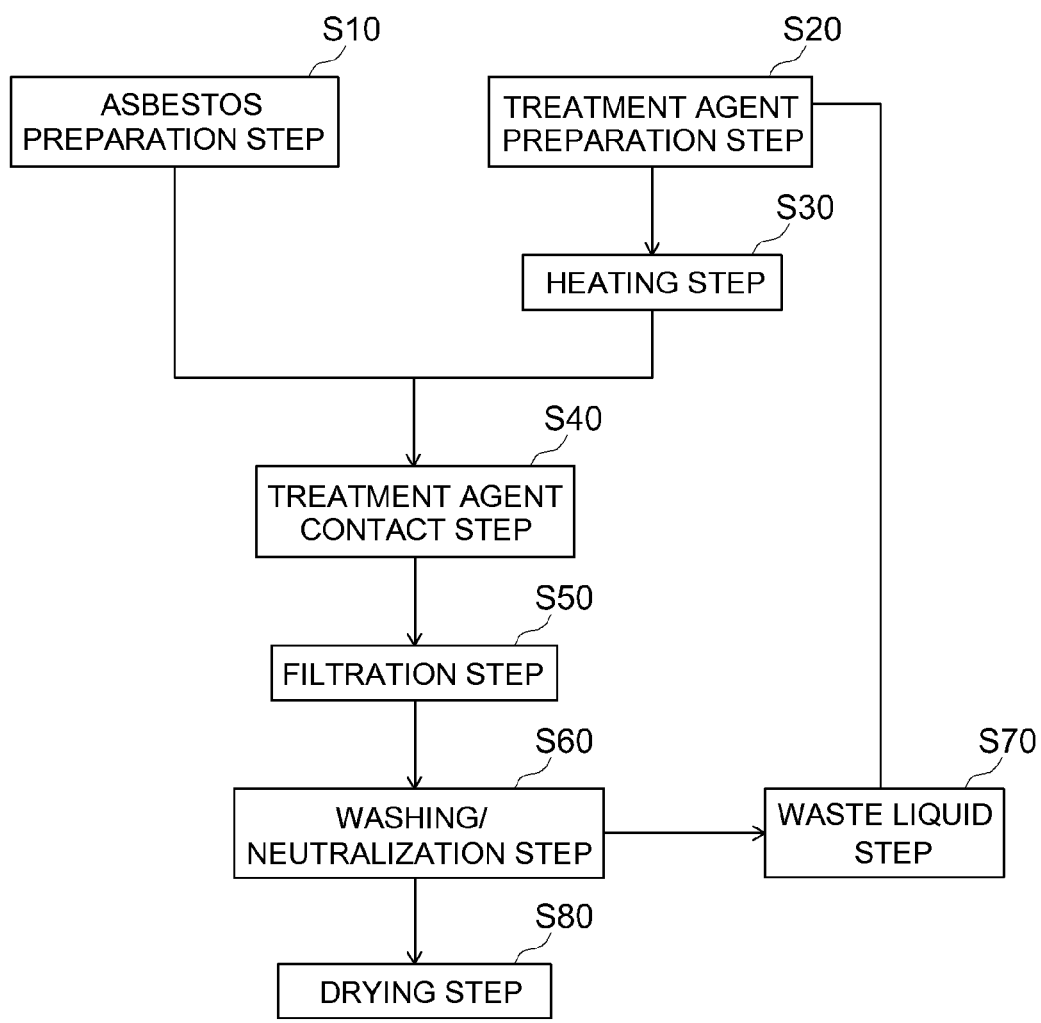
FIG. 1 is a flow chart that explains a method for detoxifying asbestos according to one embodiment of the present invention.

Preferred embodiments of the present invention will now be explained. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and technical knowledge in this technical field. Moreover, in cases where a numerical range is denoted by "A to B" in the present application, this means "not less than A and not more than B".

1. Asbestos Treatment Agent

First, an explanation will be given of the asbestos treatment agent used in the method for detoxifying asbestos according to the present embodiment.

The asbestos treatment agent according to the present embodiment contains a mineral acid, N-methyl-2-pyrrolidone and a fluoride. Specific details are given below, but by detoxifying asbestos using this type of asbestos treatment agent, asbestos in an asbestos-containing substance can be favorably detoxified. Explanations will now be given of materials contained in the asbestos treatment agent.

(1) Mineral Acid

As mentioned above, the asbestos treatment agent according to the present embodiment contains a mineral acid. Mineral acids able to be used in the past to detoxify asbestos can be used without limitation as this mineral acid. Examples of the mineral acid include sulfuric acid, hydrochloric acid, nitric acid, phosphoric acid, boric acid and hydrofluoric acid. In addition, the asbestos treatment agent according to the present embodiment may contain two or more of the mineral acids mentioned above. Moreover, among the mineral acids mentioned above, sulfuric acid can be used particularly favorably from the perspectives of being inexpensive and exhibiting high reactivity with asbestos.

Moreover, if the overall mass of the asbestos treatment agent is taken to be 100 wt %, the concentration of mineral acid is preferably 1 to 50 wt %, and more preferably 10 to 30 wt %, for example approximately 25 wt % (±1 wt %). Due to this configuration, asbestos in the asbestos-containing substance reacts favorably with the mineral acid and can be detoxified. In addition, the pH of the mineral acid-containing asbestos treatment agent is 4 or less, preferably 2 or less, and more preferably 1 or less, for example.

(2) N-methyl-2-pyrrolidone

In addition, the asbestos treatment agent of the present embodiment contains N-methyl-2-pyrrolidone (NMP), which is an organic compound having a 5-membered ring that includes a lactam structure. Specific details are given later, but because the asbestos treatment agent according to the present embodiment contains the NMP, a reaction between the mineral acids mentioned above and asbestos progresses and the asbestos can be detoxified.

Moreover, if the overall mass of the asbestos treatment agent is taken to be 100 wt %, the concentration of NMP is preferably 0.1 to 10 wt %, more preferably 1 to 10 wt %, and particularly preferably 1 to 5 wt %, for example approximately 2.5 wt % (±1 wt %). By using an asbestos treatment agent that contains an appropriate quantity of NMP in this way, asbestos can be more favorably detoxified.

(3) Fluoride

In addition, the asbestos treatment agent according to the present embodiment contains a fluoride. An asbestos treatment agent that contains this fluoride can dissolve crystals of asbestos having a needle-like crystal structure, and can therefore more favorably detoxify asbestos. Therefore, the asbestos treatment agent according to the present embodiment can be used particularly favorably to detoxify amosite and crocidolite, which are difficult to treat.

Examples of the fluoride include compounds selected from the group consisting of a fluoride salt of ammonia, a fluoride salt of alkali metal, a fluoride salt of alkaline earth metal, a hydrofluoric acid of ammonia, a hydrofluoric acid of alkali metal and a hydrofluoric acid of alkaline earth metal. By using an asbestos treatment agent that contains this type of compound, asbestos can be more favorably detoxified. Moreover, ammonium fluoride and ammonium hydrogen fluoride are particularly preferred examples of the fluorides mentioned above.

In addition, if the overall mass of the asbestos treatment agent is taken to be 100 wt %, the concentration of the fluoride is preferably 5 to 25 wt %, and more preferably 10 to 20 wt %. By using an asbestos treatment agent that contains an appropriate quantity of fluoride in this way, asbestos can be more favorably detoxified.

(4) Other Contained Substances

In addition, the asbestos treatment agent according to the present embodiment may contain a variety of components in addition to the mineral acid and NMP mentioned above. Examples of other substances able to be contained in the asbestos treatment agent include water, oxalic acid, tartaric acid, ammonia, glycolic acid, and carboxyl groups of glyoxylic acid, formic acid and the like.

2. Method for Detoxifying Asbestos

An explanation will now be given of a detoxification method that uses the asbestos treatment agent according to the embodiment described above. FIG. 1 is a flow chart that explains a method for detoxifying asbestos according to the present embodiment.

(1) Asbestos Preparation Step

In the detoxification method according to the present embodiment, an asbestos preparation step S10 is carried out so as to prepare an asbestos-containing substance to be treated, as shown in FIG. 1. In the detoxification method according to the present embodiment, the asbestos-containing substance to be treated is not particularly limited and can be a variety of materials, as long as the substance contains at least one type of asbestos. Examples of this asbestos-containing substance include a variety of construction materials, such as sprayed asbestos obtained by spraying a mixture of asbestos, cement and water, asbestos-containing slate sheets obtained by molding such a mixture into the form of sheets, and asbestos-containing heat insulation materials. In addition, the detoxification method according to the present embodiment can also be used to treat materials other than these construction materials.

Examples of types of asbestos contained in the asbestos-containing substance include chrysotile ($Mg_3Si_2O_5(OH)_4$), amosite (($Fe,Mg)_7Si_8O_{22}(OH)_2$) and crocidolite ($Na_2Fe^{2+}_3Fe^{3+}_2Si_8O_{22}(OH)_2$). In addition, the asbestos-containing substance to be treated in the asbestos treatment method according to the present embodiment may contain a plurality of these types of asbestos. Moreover, among the types of asbestos mentioned above, amosite and crocidolite have the characteristic of being difficult to detoxify, but it was confirmed through experiments that amosite and crocidolite can be favorably detoxified by using the detoxification method according to the present embodiment.

In addition, the asbestos-containing substance may contain a variety of impurities in addition to types of asbestos such as those mentioned above. Examples of such impurities include brucite ($Mg(OH)_2$), quartz ($\alpha$-quartz: $SiO_2$), calcite ($CaCO_3$), magnetite ($Fe_3O_4$), silica ($SiO_2$) and calcium carbonate ($CaCO_3$).

Moreover, it is preferable for the asbestos-containing substance to be treated in the detoxification method according to the present embodiment to be subjected to a fragmentation/pulverization process before carrying out a treatment agent contact step S40, which is described later. By using a powdered asbestos-containing substance obtained using such a fragmentation/pulverization process as substance to be treated, the area of contact between the asbestos treatment agent and the asbestos-containing substance increases, which contributes to a shortening of the treatment time.

In addition, by performing X-Ray diffraction analysis on an asbestos-containing substance that has been subjected to a fragmentation/pulverization process in this way, it was confirmed that the peak half value width increases. As a result, it is understood that distortion occurs in an asbestos-containing substance that has been subjected to a fragmentation/pulverization process, and that reactivity between the asbestos treatment agent and the asbestos-containing substance is further improved as a result of this distortion.

A publicly known means able to be used for fragmentation/pulverization of construction materials or waste materials can be used without particular limitation as the fragmentation/pulverization process for the asbestos-containing substance. For example, in cases where the size of the asbestos-containing substance to be treated is large, it is preferable to carry out a coarse pulverization process in advance using a jaw crusher, an impact crusher, or the like, and then carry out a fine pulverization process using a ball mill, a vibrating mill, or the like. In this way, a powdered asbestos-containing substance having a small particle diameter can be favorably obtained. For example, it is preferable to fragment (pulverize) an asbestos-containing substance so that almost all of the substance to be treated has a particle diameter of several millimeters or less (for example, 1 mm or less). Moreover, from the perspective of adverse effects on the surrounding environment caused by scattering of a powdered asbestos-containing substance, it is preferable for the fragmentation/pulverization process to be carried out in a sealed environment or a humid environment.

(2) Treatment Agent Preparation Step

In the detoxification method according to the present embodiment, an asbestos treatment agent containing a mineral acid, NMP and a fluoride is next prepared (a treatment agent preparation step S20).

In the present step, the preparation means is not particularly limited as long as an asbestos treatment agent containing a mineral acid, NMP and a fluoride can be prepared. For example, an asbestos treatment agent can be prepared by mixing a mineral acid mentioned above, NMP and a fluoride, or by separately preparing asbestos treatment agents prepared in advance. In addition, components of a spent asbestos treatment agent (a residual liquid) recovered in a filtration step S50, which is described later, may be modified and re-used.

(3) Heating Step

In addition, in the detoxification method according to the present embodiment, a heating step S30 for heating the asbestos treatment agent is carried out before bringing the asbestos treatment agent into contact with the asbestos-containing substance. By heating the asbestos treatment agent in advance prior to use in this way, reactivity of the mineral acid in the asbestos treatment agent can be improved and the time required for detoxification can be shortened.

Moreover, the temperature of the asbestos treatment agent in the heating step S30 is preferably set to 50° C. or higher, and more preferably set to 60° C. or higher (for example, 70° C.). Meanwhile, because the reactivity of the mineral acid becomes excessively high and safety problems occur if the asbestos treatment agent is excessively heated, in cases where the heating step S30 is carried out, it is preferable for the temperature of the asbestos treatment agent to be lower than the boiling point thereof (for example, 80° C. or lower).

Moreover, the means for heating the asbestos treatment agent in the present step is not particularly limited, and a variety of conventional publicly known means can be used. Examples of such heating means include heaters and microwaves.

(4) Treatment Agent Contact Step

In the detoxification method according to the present embodiment, a treatment agent contact step S40 for bringing the asbestos-containing substance into contact with the asbestos treatment agent is next carried out. By carrying out the present step, the asbestos-containing substance reacts with the asbestos treatment agent and asbestos in the asbestos-containing substance is detoxified.

Here, by using an asbestos treatment agent that contains a mineral acid, NMP and a fluoride, as in the present embodiment, asbestos in an asbestos-containing substance can be detoxified more favorably than in the past. Although not particularly limited, it is preferable to adjust the quantity ratio of the asbestos-containing substance and the asbestos treatment agent so that the quantity of asbestos to be treated is approximately 5 to 50 g (for example, 10 to 30 g) relative to 100 mL of an asbestos treatment agent containing, for example, 10 to 30 wt % of sulfuric acid ($H_2SO_4$) as a mineral acid.

An explanation will now be given using an example of a reaction in a case in which amosite is used as the asbestos to be treated, sulfuric acid is used as the mineral acid in the asbestos treatment agent, and ammonium fluoride is used as the fluoride. Moreover, the explanation given below is not intended to be limited in terms of the type of asbestos to be treated, mineral acid or fluoride, and the detoxification method disclosed here can be appropriately altered if necessary according to the type of asbestos, mineral acid or fluoride being used.

In cases where an asbestos-containing substance that contains amosite and an asbestos treatment agent that contains sulfuric acid and ammonium fluoride are brought into contact with each other and reacted, it is surmised that a reaction such as that shown in formula (1) below takes place.

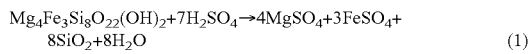

$$Mg_4Fe_3Si_8O_{22}(OH)_2 + 7H_2SO_4 \rightarrow 4MgSO_4 + 3FeSO_4 + 8SiO_2 + 8H_2O \qquad (1)$$

However, when an asbestos-containing substance that had been subjected to the present step (hereinafter referred to as a "treated product") was analyzed by the inventors of the present invention, almost no amosite was present due to having been detoxified, but the presence of magnesium sulfate ($MgSO_4$), which is produced when amosite and a mixture of sulfuric acid and ammonium fluoride react, was not confirmed. In addition, it was confirmed that caminite ($MgSO_4(Mg(OH)_2)_{0.33}(H_2O)_{0.33}$) was produced instead of magnesium sulfate ($MgSO_4$) in the treated product.

Therefore, in cases where an asbestos treatment agent containing a mineral acid, NMP and a fluoride is used, as in the detoxification method according to the present embodiment, because the NMP contributes to progression of the reaction between the mixture of the mineral acid and fluoride and asbestos, it is surmised that the asbestos detoxification reaction progresses further and the asbestos is favorably detoxified.

Moreover, it is preferable for the present step to be carried out continuously for a prescribed period of time so that the asbestos and the asbestos treatment agent can react well. Specifically, the period of contact between the asbestos-containing substance and the asbestos treatment agent in the present embodiment is preferably 30 minutes or longer, more preferably 1 hour or longer, and particularly preferably 1 to 2 hours (for example, 1.5 hours). By setting the period of contact between the asbestos-containing substance and the asbestos treatment agent in this way, the asbestos and the asbestos treatment agent react with each other well and the asbestos can be rapidly and favorably detoxified.

(5) Filtration Step

In the present embodiment, a filtration step S50 for filtering the treated product is then carried out after the treatment agent contact step S40. For example, a prescribed filtration apparatus such as a pressure filter (for filter press) can be used without particular limitation in the filtration step S50.

Moreover, by recovering spent asbestos treatment agent (a residual liquid) separated in the present step and modifying components in the recovered residual liquid in the detoxification method according to the present embodiment, as mentioned above, the residual liquid can be reused as an asbestos treatment agent. Constituting in this way can contribute to a reduction in treatment costs and the burden on the environment.

(6) Washing/Neutralization Step

In the present embodiment, a washing/neutralization step S60 for washing and neutralizing the treated product is carried out after the filtration step S50. In this washing/neutralization step S60, it is preferable to repeat multiple times a treatment involving, for example, dispersing the treated product in a washing liquid such as water and then re-filtering.

Moreover, in view of the burden on the environment, the washing liquid used in the present step is discarded after being subjected to a waste liquid step S70 including adding a coagulant, a neutralizing agent, or the like, or removing precipitates and the like.

(7) Drying Step

In the detoxification method according to the present embodiment, a drying step S80 for drying the treated product is carried out after the washing step S60 mentioned above. Because asbestos has been reliably detoxified in the thus obtained treated product, the treated product has no adverse effects on humans or the environment and can be safely and easily discarded by means of a method such as burial.

In addition, the treated product produced by the detoxification method according to the present embodiment contains large quantities of gypsum, and because asbestos has been reliably removed, the treated product can be reused as a gypsum-containing construction material. In other words, the detoxification method according to the present embodiment can be carried out as a method for producing a gypsum-containing construction material.

Although a detailed explanation is omitted here, the inventors of the present invention carried out the detoxification method according to the present embodiment and then confirmed whether or not asbestos (for example, amosite or crocidolite) was present in a treated product using a variety of means, such as X-Ray diffraction, a phase contrast microscope and a transmission electron microscope (TEM), but the presence of asbestos having a needle-like crystal structure was not observed when using any of these means for confirmation.

Therefore, it was confirmed that use of an asbestos treatment agent containing a mineral acid, NMP and a fluoride in the detoxification method according to the present embodiment can rapidly and reliably detoxify asbestos in an asbestos-containing substance and can greatly contribute to a reduction in adverse effects on humans and the environment by asbestos.

3. Other Embodiments

An explanation has been given above of a method for detoxifying asbestos according to one embodiment of the present invention. However, the method for detoxifying asbestosis disclosed here is not limited to the embodiment described above, and a variety of modifications may be carried out.

For example, the heating step S30 for heating the asbestos treatment agent in advance is carried out in the detoxification method according to the embodiment described above, as shown in FIG. 1, but this heating step S30 may be omitted. Specifically, even in cases where the asbestos treatment agent is used at normal temperature, asbestos in an asbestos-containing substance can be detoxified well. However, it is preferable to heat the asbestos treatment agent in advance, as in the embodiment described above, in order to exponentially improve the reactivity of the mineral acid. In addition, it is not essential to separately provide the heating step and the treatment agent contact step, as in the embodiment mentioned above, and it is possible, for example, to heat the asbestos treatment agent while carrying out the treatment agent contact step.

In addition, the filtration step S50, the washing/neutralization step S60, the waste liquid step S70 and the drying step S80 are carried out after carrying out the treatment agent contact step S40 in the embodiment described above.

However, the detoxification method disclosed here should include a step for preparing an asbestos-containing substance (an asbestos preparation step), a step for preparing an asbestos treatment agent that contains a mineral acid, NMP and a fluoride (a treatment agent preparation step) and a step for bringing the asbestos treatment agent into contact with an asbestos-containing substance (a treatment agent contact step), and steps other than these may be appropriately altered according to treatment facilities and the treatment environment.

EXPERIMENTAL EXAMPLES

Explanations will now be given of several experimental examples relating to the present invention. Moreover, the present invention is not intended to be limited to the experimental examples below.

First Experiment

In the present experiment, asbestos in an asbestos-containing substance was detoxified using an asbestos treatment agent containing a mineral acid, N-methyl-2-pyrrolidone and a fluoride, and the composition of the treated product was investigated.

1. Detoxification Procedure

In the present experiment, an asbestos treatment agent containing 25 wt % of sulfuric acid, 25 mg/L of NMP and 10% of ammonium fluoride was first prepared using water as a medium, and this asbestos treatment agent was then heated to 70° C. Next, a powdered asbestos-containing substance containing amosite as a primary component and adjusted to a particle diameter of several millimeters or less (approximately 1 mm or less) (hereinafter referred to as an "amosite standard sample") was prepared, and this amosite standard sample was mixed with the asbestos treatment agent and held for 2 hours while being stirred. The mixed liquid was then subjected to centrifugal separation, the settled solid treated product (residue) was collected, and this treated product was washed with water and then dried.

2. Evaluation Experiments

In the present experiment, the composition of the treated product obtained as a result of the detoxification mentioned above was investigated using the following evaluation experiments.

Figure 2:
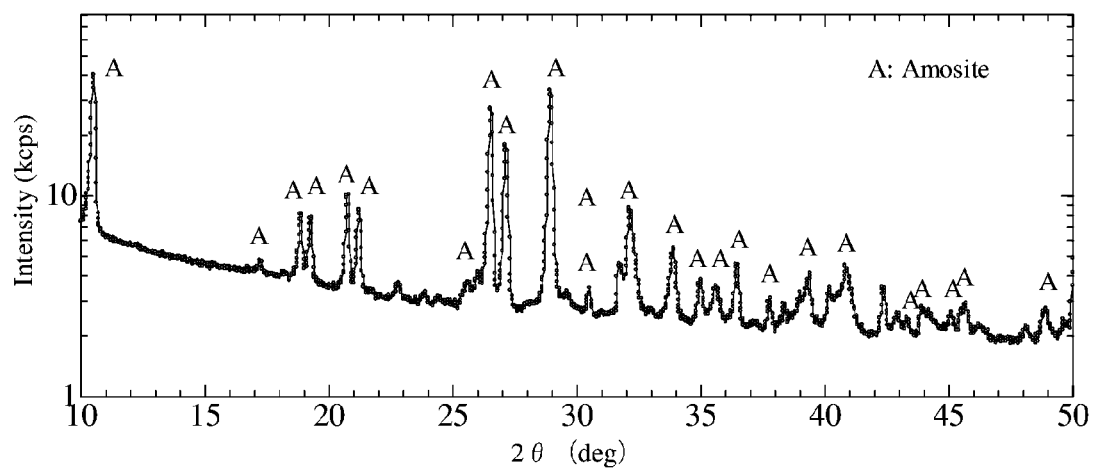
FIG. 2 is a diagram that shows X-Ray diffraction results for an amosite standard sample used in the first experiment.
Figure 3:
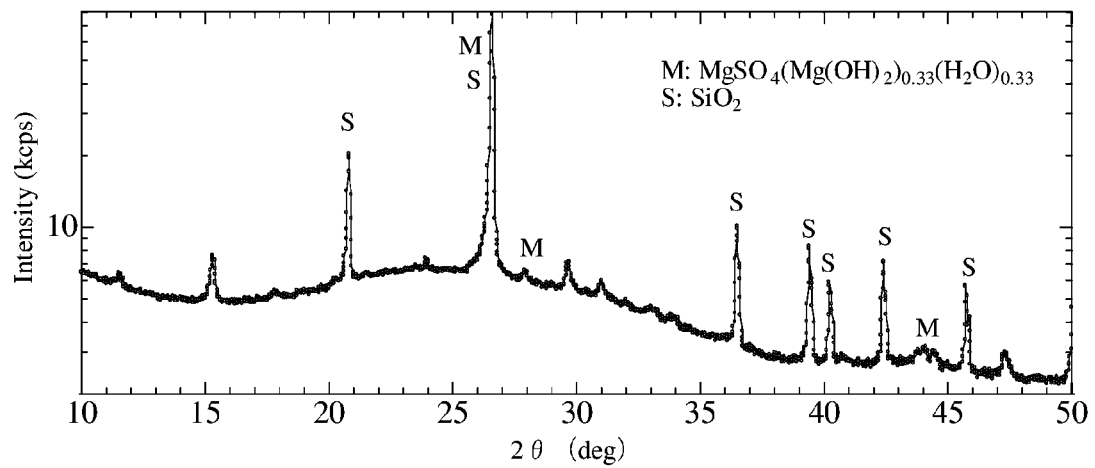
FIG. 3 is a diagram that shows X-Ray diffraction results for a treated product following detoxification in the first experiment.

In the present evaluation experiment, the amosite standard sample prior to detoxification and the treated product following detoxification were subjected to X-Ray diffraction analysis, and compounds contained in the standard sample and the treated product were analyzed. In this X-Ray diffraction analysis, an X-Ray diffraction apparatus available from Rigaku Corporation (Ultima IX) was used and a copper anticathode tube that generates Cu-Kα rays was used as the X-Ray source. In addition, X-Ray diffraction analysis was carried out at a tube voltage of 40 kV and a tube current of 40 mA, and observed X-Ray diffraction peaks were identified using X-Ray diffraction database software (ICCD: International center for Diffraction data). X-Ray diffraction analysis data for the amosite standard sample used in the first experiment is shown in FIG. 2, and X-Ray diffraction analysis data for the treated product following detoxification in the first experiment is shown in FIG. 3. Moreover, in the X-Ray diffraction analysis results shown in the present specification, the vertical axis is a logarithmic scale in order to accurately confirm peaks having weak diffraction intensities.

As shown in FIG. 2, the amosite standard sample prior to detoxification showed strong peaks derived from amosite at 10.6°, 27.3° and 29.1° (see "A" in FIG. 2).

However, in the X-Ray diffraction analysis results for the treated product following detoxification shown in FIG. 3, surprising results were obtained, namely that peaks derived from amosite, such as those mentioned above, had disappeared. Therefore, it was confirmed that amosite, which is difficult to detoxify, can be favorably detoxified by using an asbestos treatment agent that contains a mineral acid (sulfuric acid), NMP and a fluoride.

In addition, the presence of peaks derived from $MgH_2(SO_4)_2H_2O$ (see "M" in FIG. 3) and peaks derived from $SiO_2$ (see "S" in FIG. 3) were confirmed in the treated product following detoxification. In cases where amosite reacts with a mixture of sulfuric acid and ammonium fluoride, it is surmised that magnesium sulfate ($MgSO_4$) is generally contained in a treated product.

However, magnesium sulfate was not contained in the treated product following detoxification in the present experimental example (peaks at 24.6°, 25.2°, 33.4° and 36.7° derived from magnesium sulfate were not observed). Therefore, it is surmised that an asbestos detoxification reaction progresses further by reacting asbestos with a mixture of a mineral acid and a fluoride in the presence of NMP.

Second Experiment

Tests relating to the period of contact between an asbestos treatment agent and an asbestos-containing substance were carried out in the present experiment.

1. Explanation of Samples (1) Example 1

In Example 1, amosite contained in an asbestos-containing substance (an amosite standard sample) was detoxified using an asbestos treatment agent containing 25 wt % of sulfuric acid, 2.5 mg/L of NMP and 10% of ammonium fluoride. Here, the period of contact between the asbestos treatment agent and the asbestos-containing substance (the holding time following mixing) was set to be 10 minutes. Moreover, other treatment procedures were carried out under the same conditions as those used in the first experiment described above.

(2) Example 2

In Example 2, amosite contained in an amosite standard sample was detoxified under the same conditions as those used in Example 1, except that the period of contact between the asbestos treatment agent and the amosite standard sample was changed to 30 minutes.

(3) Example 3

In Example 3, amosite contained in an amosite standard sample was detoxified under the same conditions as those used in Example 1, except that the period of contact between the asbestos treatment agent and the amosite standard sample was changed to 1 hour.

(4) Example 4

In Example 4, amosite contained in an amosite standard sample was detoxified under the same conditions as those used in Example 1, except that the period of contact between the asbestos treatment agent and the amosite standard sample was changed to 2 hours.

(5) Example 5

In Example 5, amosite contained in an amosite standard sample was detoxified under the same conditions as those used in Example 1, except that the period of contact between the asbestos treatment agent and the amosite standard sample was changed to 4 hours.

2. Evaluation Experiments

In the present experiment, treated products following detoxification in Examples 1 to 5 were subjected to X-Ray diffraction analysis. Moreover, the X-Ray diffraction analysis conditions were the same as those used in the first experiment above.

Figure 4:
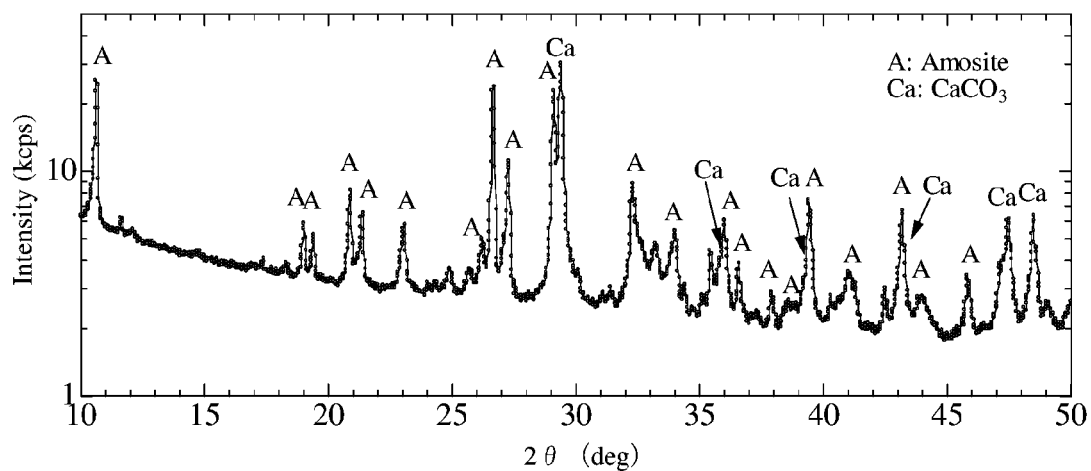
FIG. 4 is a diagram that shows X-Ray diffraction results for an amosite standard sample used in the second experiment.
Figure 5:
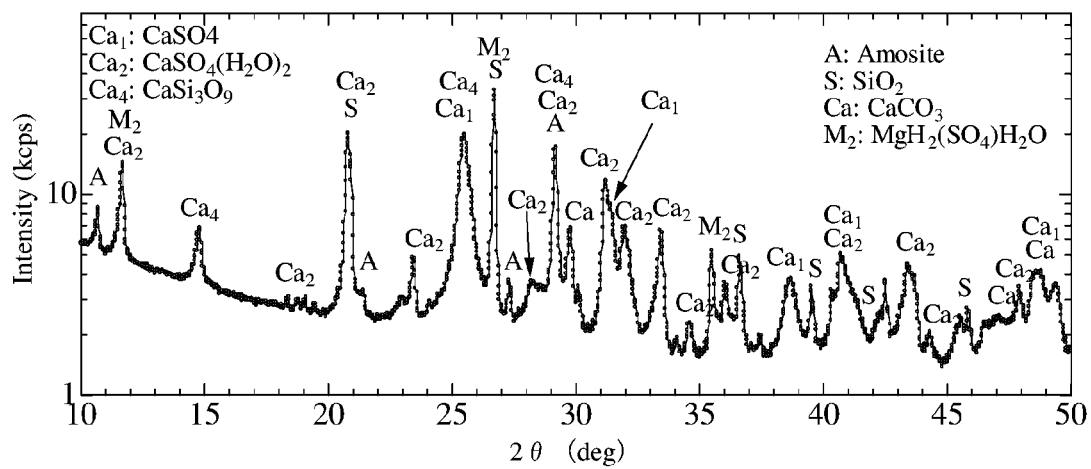
FIG. 5 is a diagram that shows X-Ray diffraction results for a treated product following detoxification in Example 1.
Figure 6:
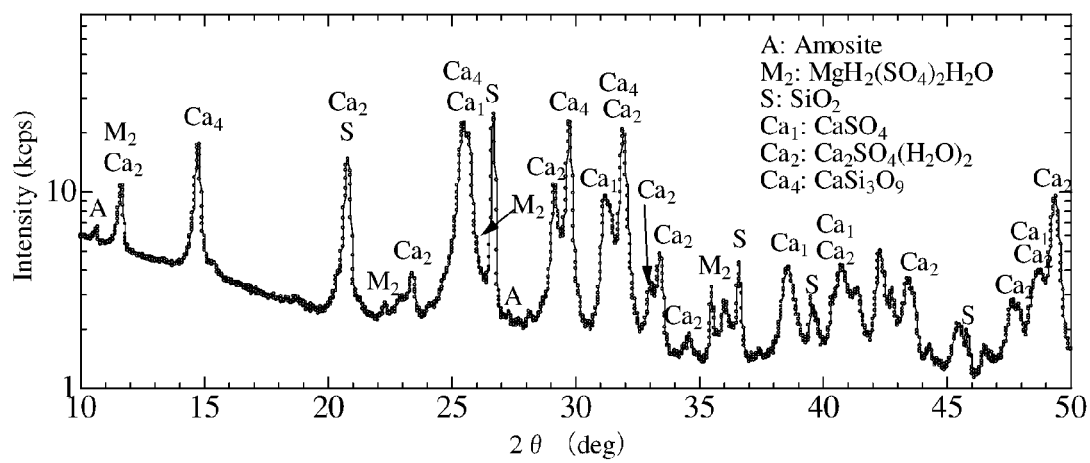
FIG. 6 is a diagram that shows X-Ray diffraction results for a treated product following detoxification in Example 2.
Figure 7:
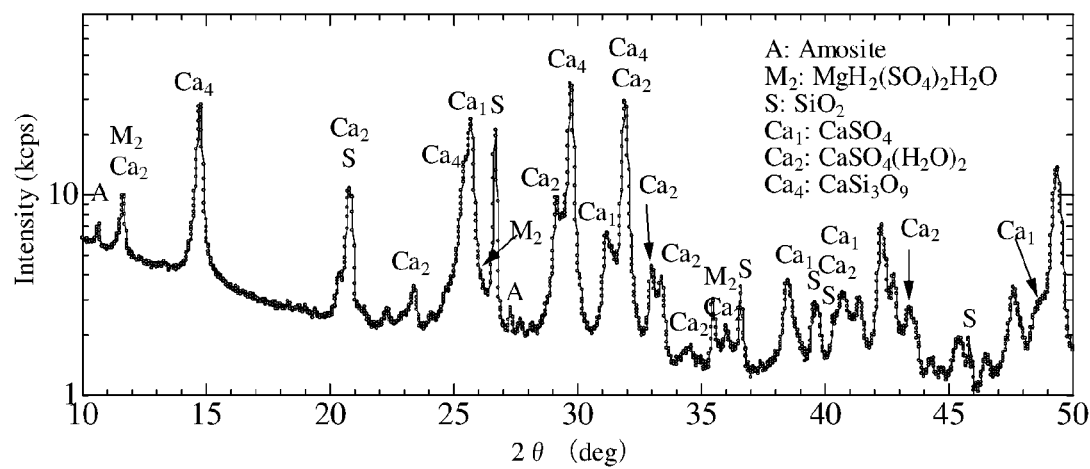
FIG. 7 is a diagram that shows X-Ray diffraction results for a treated product following detoxification in Example 3.
Figure 8:
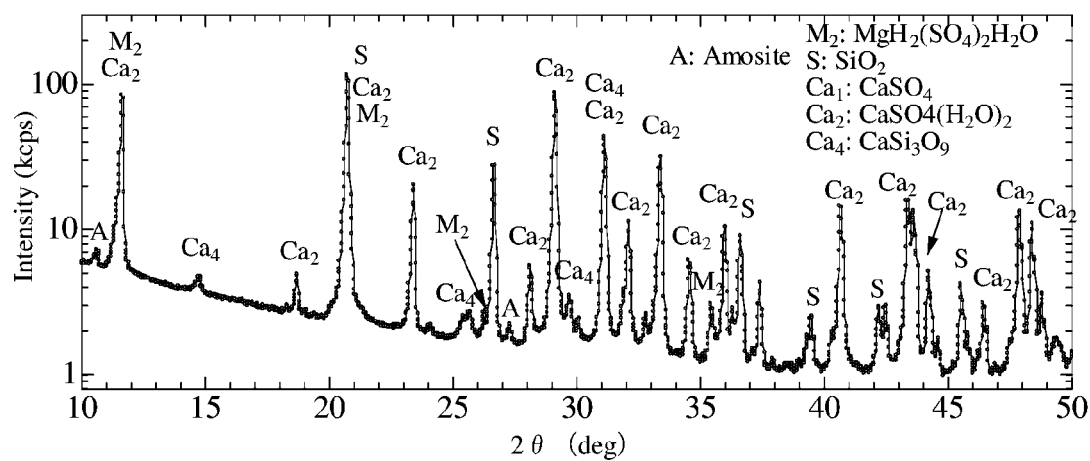
FIG. 8 is a diagram that shows X-Ray diffraction results for a treated product following detoxification in Example 4.
Figure 9:
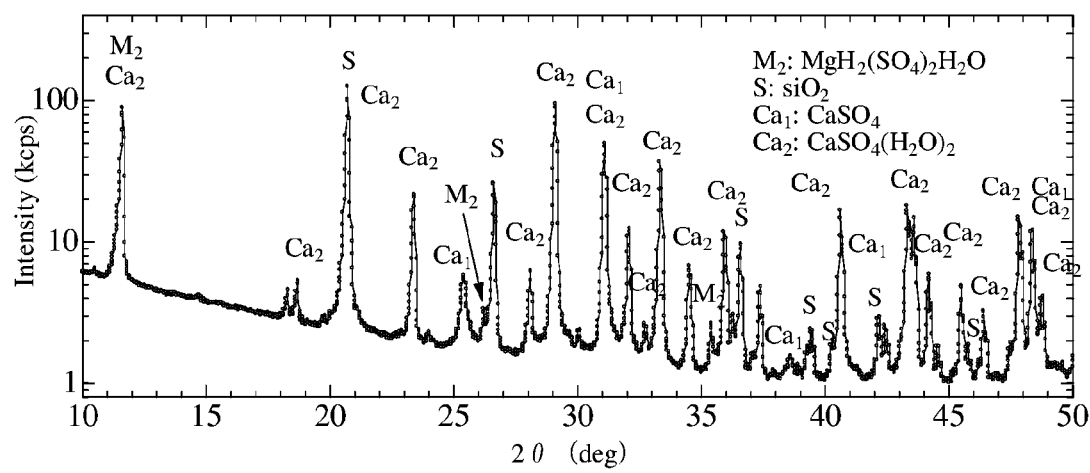
FIG. 9 is a diagram that shows X-Ray diffraction results for a treated product following detoxification in Example 5.

FIG. 4 shows X-Ray diffraction results for an amosite standard sample prior to detoxification. In addition, FIGS. 5 to 9 are diagrams that show X-Ray diffraction results for treated products following detoxification in Examples 1 to 5.

First, as a result of subjecting an amosite standard sample prior to detoxification to X-Ray diffraction analysis, it was confirmed that the amosite standard sample used in the present experiment contained $CaCO_3$ (see "Ca" in FIG. 4) as an impurity in addition to amosite (see "A" in the diagram), as shown in FIG. 4.

In addition, in all of Examples 1 to 5, in which detoxification was carried out using asbestos treatment agents containing sulfuric acid, NMP and a fluoride, the intensity of peaks derived from amosite was lower than in the amosite standard sample prior to detoxification, as shown in FIGS. 5 to 9, and it was confirmed that $MgH_2(SO_4)_2H_2O$ (see "$M_2$" in FIGS. 5 to 9) was produced.

In addition to the $MgH_2(SO_4)_2H_2O$ mentioned above, the presence of $CaSO_4$ (see "$Ca_1$" in the diagrams), $CaSO_4(H_2O)_2$ (see "$Ca_2$" in the diagrams), $CaSi_3O_9$ (see "$Ca_4$" in the diagrams), $SiO_2$ (see "S" in the diagrams), and the like, was also confirmed in Examples 1 to 5, as shown in FIGS. 5 to 9.

In addition, comparing Examples 1 to 5, in which the period of contact between an asbestos treatment agent and an amosite standard sample was varied, it was confirmed that the intensity of peaks derived from amosite (for examples, peaks at 10.6°, 27.3° and 29.1°) decreased as the period of contact increased. In addition, peaks derived from amosite had almost disappeared in Examples 4 and 5, in which the period of contact was 2 hours or longer. Therefore, in cases where an asbestos treatment agent containing a mineral acid, NMP and a fluoride was used, it was confirmed that amosite could be reliably detoxified by setting the period of contact between the asbestos treatment agent and the asbestos-containing substance to be 2 hours or longer.

Next, compounds contained in a spent asbestos treatment agent were identified in the present experiment. Specifically, a liquid obtained by subjecting the asbestos treatment agent used in Example 4 to suction filtration using a filter (opening size: 5 μm) was dried, and the dried solid content (asbestos treatment agent residue) was subjected to X-Ray diffraction analysis. Moreover, the X-Ray diffraction analysis conditions were the same as those used in the first experiment above. Results of X-Ray diffraction analysis of the asbestos treatment agent residue are shown in FIG. 10.

Figure 10:
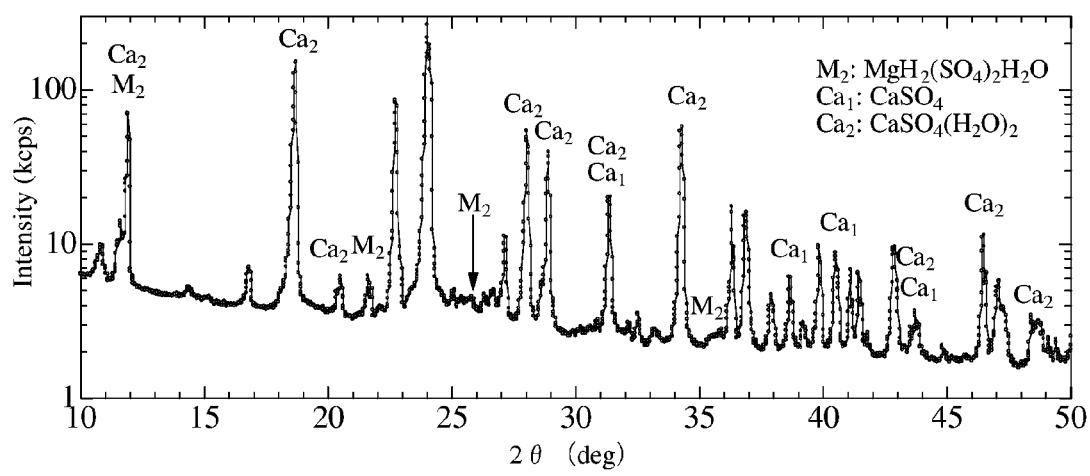
FIG. 10 is a diagram that shows X-Ray diffraction results for a residue of the asbestos treatment agent used in the detoxification in Example 4.

As shown in FIG. 10, it was confirmed that the spent asbestos treatment agent contained $MgH_2(SO_4)_2H_2O$, calcium sulfate ($CaSO_4$) and a hydrate thereof ($CaSO_4(H_2O)_2$). In addition, the presence of asbestos (amosite) was not confirmed in the spent asbestos treatment agent.

Third Experiment

In the present experiment, detoxification results were investigated for cases in which an asbestos-containing substance containing mainly crocidolite was used as a substance to be treated.

1. Detoxification Procedure

In the present experiment, an asbestos treatment agent containing 25 wt % of sulfuric acid, 25 mg/L of NMP and 20% of ammonium fluoride was first prepared, and this asbestos treatment agent was then heated to 70° C. Next, a powdered asbestos-containing substance containing crocidolite as a primary component and adjusted to a particle diameter of several millimeters or less (approximately 1 mm or less) (hereinafter referred to as a "crocidolite standard sample") was prepared, and this crocidolite standard sample was mixed with the asbestos treatment agent and held for 2 hours while being stirred. The mixed liquid was then subjected to centrifugal separation, the settled solid treated product (residue) was collected, and this treated product was washed with water and then dried.

2. Evaluation Experiments

In the present experiment, the crocidolite standard sample prior to detoxification and the treated product following detoxification were subjected to X-Ray diffraction analysis, and compounds contained in the standard sample and the treated product were analyzed. Moreover, the X-Ray diffraction analysis conditions were the same as those used in the first experiment above. X-Ray diffraction analysis data for the crocidolite standard sample used in the third experiment is shown in FIG. 11, and X-Ray diffraction analysis data for the treated product following detoxification in the third experiment is shown in FIG. 12.

Figure 11:
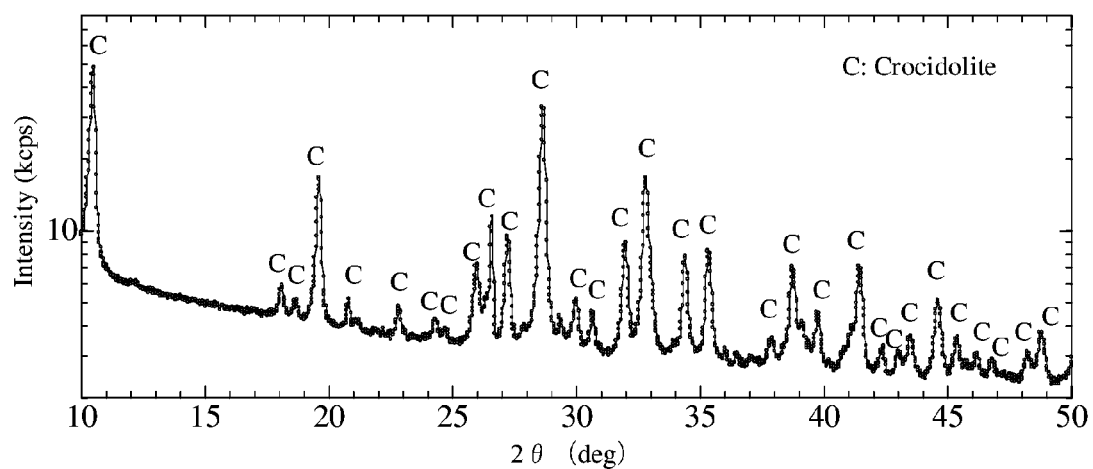
FIG. 11 is a diagram that shows X-Ray diffraction results for a crocidolite standard sample used in the third experiment.

As shown in FIG. 11, the crocidolite standard sample prior to detoxification showed strong peaks derived from crocidolite at 10.5°, 28.7° and 33.8° (see "C" in FIG. 11).

Figure 12:
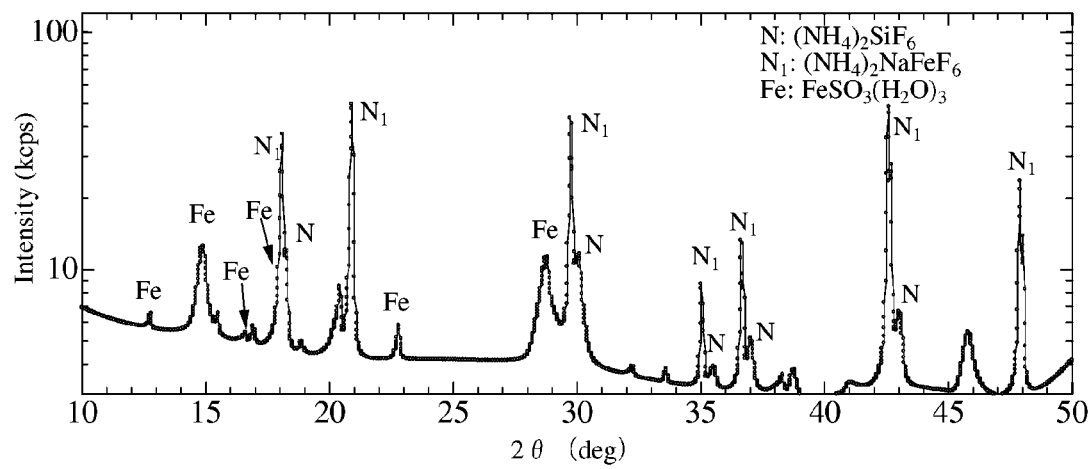
FIG. 12 is a diagram that shows X-Ray diffraction results for a treated product following detoxification in the third experiment.

However, in the X-Ray diffraction analysis results for the treated product following detoxification shown in FIG. 12, peaks derived from crocidolite, such as those mentioned above, had disappeared. In addition, the presence of $(NH_4)_2SiF_6$ (see "N" in FIG. 12), $(NH_4)_2NaFeF_6$ (see "$N_2$" in FIG. 12) and $FeSO_3(H_2O)_3$ (see "Fe" in FIG. 12) were confirmed in the treated product following detoxification. Therefore, it was confirmed that in addition to amosite described above, crocidolite can also be favorably detoxified by using an asbestos treatment agent that contains a mineral acid (sulfuric acid), NMP and a fluoride.

Fourth Experiment

In the present experiment, investigations were carried out into the period of contact between an asbestos treatment agent and a crocidolite standard sample.

1. Explanation of Samples (1) Example 6

In Example 6, crocidolite in a crocidolite standard sample was detoxified under the same conditions as those used in Example 1 in the second experiment described above, except that a crocidolite standard sample that contained crocidolite was used as the substance to be detoxified and the concentration of ammonium fluoride was changed to 20 wt %.

(2) Example 7

In Example 7, crocidolite contained in a crocidolite standard sample was detoxified under the same conditions as those used in Example 6, except that the period of contact between the asbestos treatment agent and the crocidolite standard sample was changed to 30 minutes.

(3) Example 8

In Example 8, crocidolite contained in a crocidolite standard sample was detoxified under the same conditions as those used in Example 6, except that the period of contact between the asbestos treatment agent and the crocidolite standard sample was changed to 1 hour.

(4) Example 9

In Example 9, crocidolite contained in a crocidolite standard sample was detoxified under the same conditions as those used in Example 6, except that the period of contact between the asbestos treatment agent and the crocidolite standard sample was changed to 2 hours.

(5) Example 10

In Example 10, crocidolite contained in a crocidolite standard sample was detoxified under the same conditions as those used in Example 6, except that the period of contact between the asbestos treatment agent and the crocidolite standard sample was changed to 4 hours.

2. Evaluation Experiments (1) Analysis of Treated Product

Figure 13:
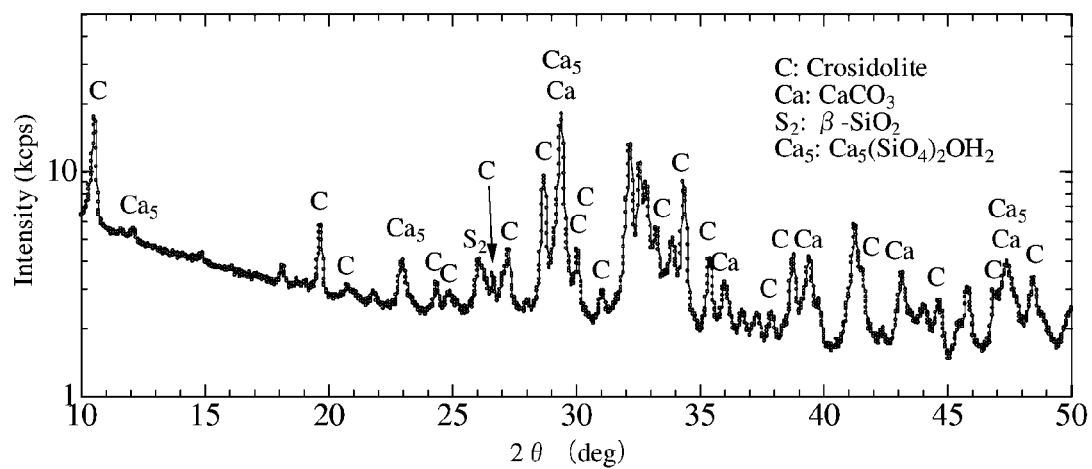
FIG. 13 is a diagram that shows X-Ray diffraction results for a crocidolite standard sample used in the fourth experiment.
Figure 14:
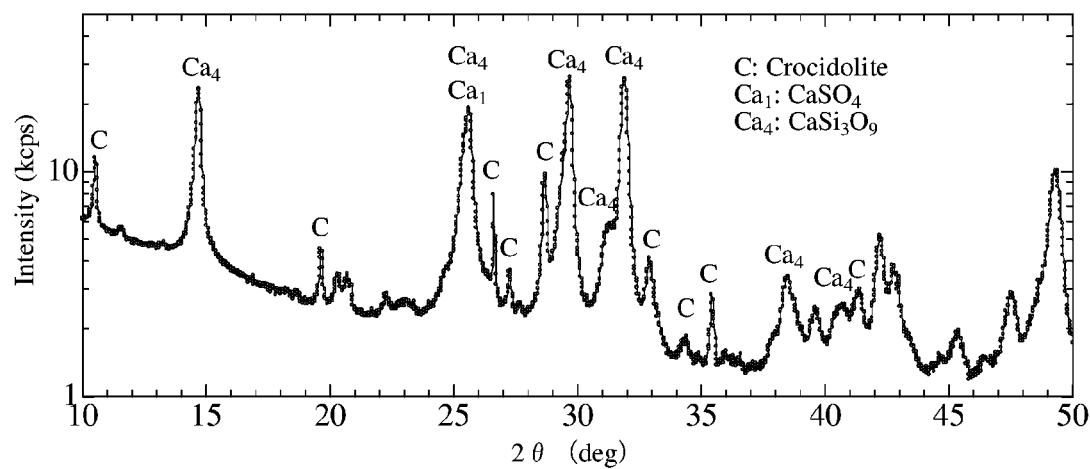
FIG. 14 is a diagram that shows X-Ray diffraction results for a treated product following detoxification in Example 6.
Figure 15:
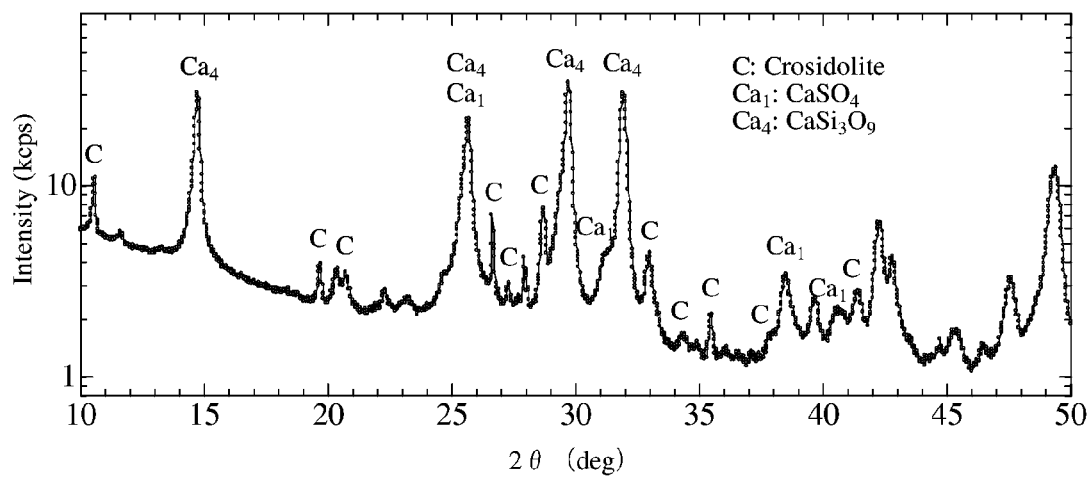
FIG. 15 is a diagram that shows X-Ray diffraction results for a treated product following detoxification in Example 7.
Figure 16:
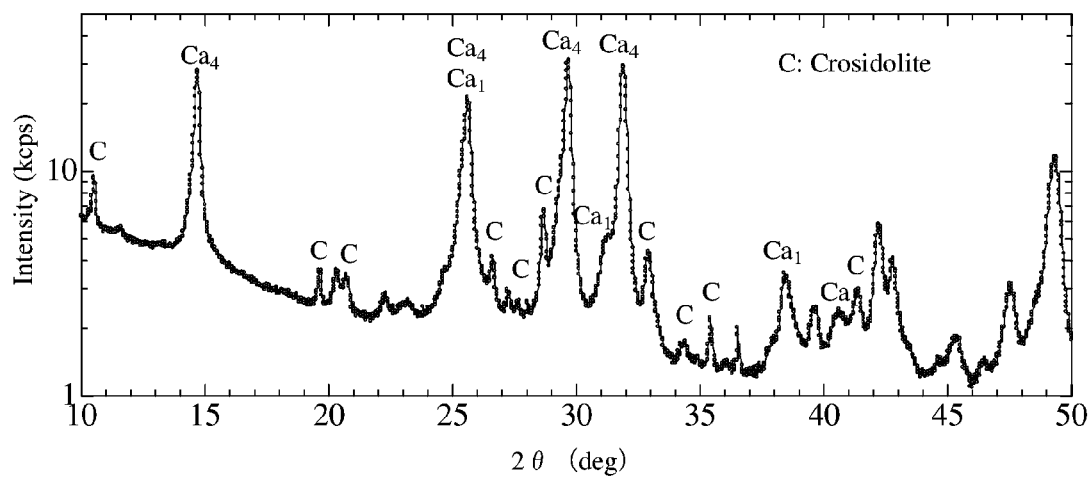
FIG. 16 is a diagram that shows X-Ray diffraction results for a treated product following detoxification in Example 8.
Figure 17:
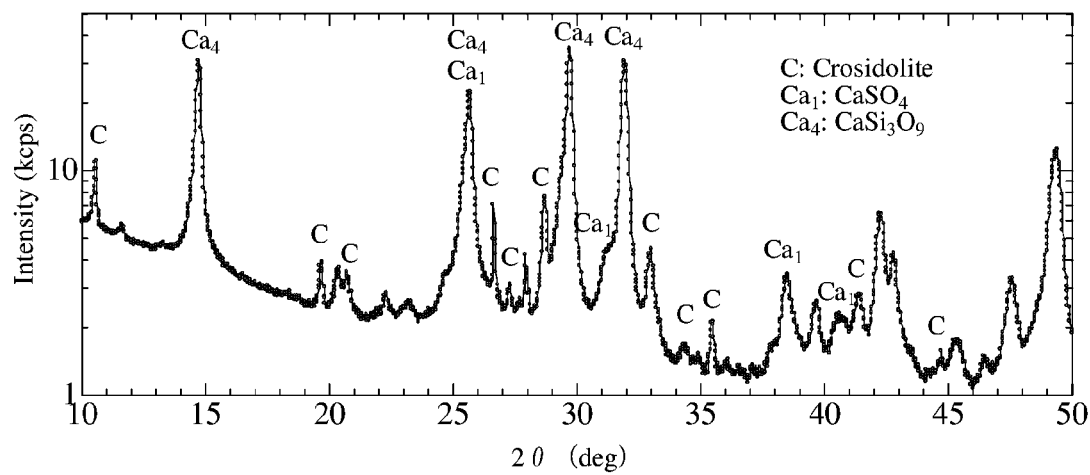
FIG. 17 is a diagram that shows X-Ray diffraction results for a treated product following detoxification in Example 9.
Figure 18:
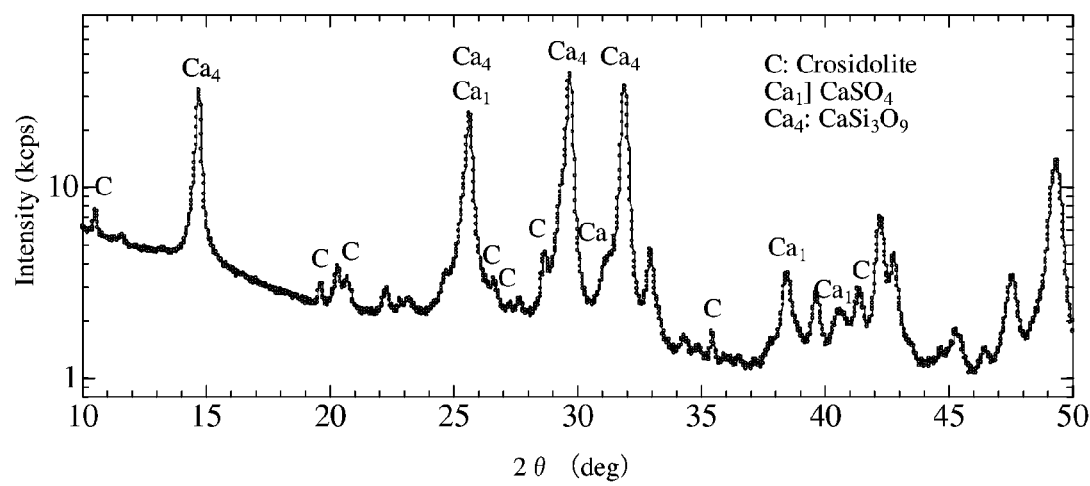
FIG. 18 is a diagram that shows X-Ray diffraction results for a treated product following detoxification in Example 10.

In the present experiment, a crocidolite standard sample following detoxification (a treated product) was subjected to X-Ray diffraction analysis using a similar procedure to that used in the first experiment above. FIG. 13 shows X-Ray diffraction results for a crocidolite standard sample used in the fourth experiment and FIGS. 14 to 18 show X-Ray diffraction results for treated products following detoxification in Examples 6 to 10.

First, as a result of subjecting a crocidolite standard sample prior to detoxification to X-Ray diffraction analysis, it was confirmed that the crocidolite standard sample used in the present experiment contained $\beta\text{-}SiO_2$ (see "S" in FIG. 13), $Ca(CO_3)$ (see "Ca" in FIG. 13) and $Ca_5(SiO_4)_2OH_2$ (see "$Ca_5$" in FIG. 13) as impurities in addition to crocidolite (see "C" in FIG. 17), as shown in FIG. 13.

In addition, it was confirmed that the intensity of peaks derived from crocidolite (at 10.5°, 28.7° and 33.8°) decreased in Examples 6 to 10, as shown in FIGS. 14 to 18. In particular, the size of peaks derived from crocidolite was greatly reduced in Examples 9 and 10, in which the treatment time was 2 hours or longer.

(2) Analysis of Spent Asbestos Treatment Agent

In addition, compounds contained in a spent asbestos treatment agent were identified in the present experiment.

Figure 19:
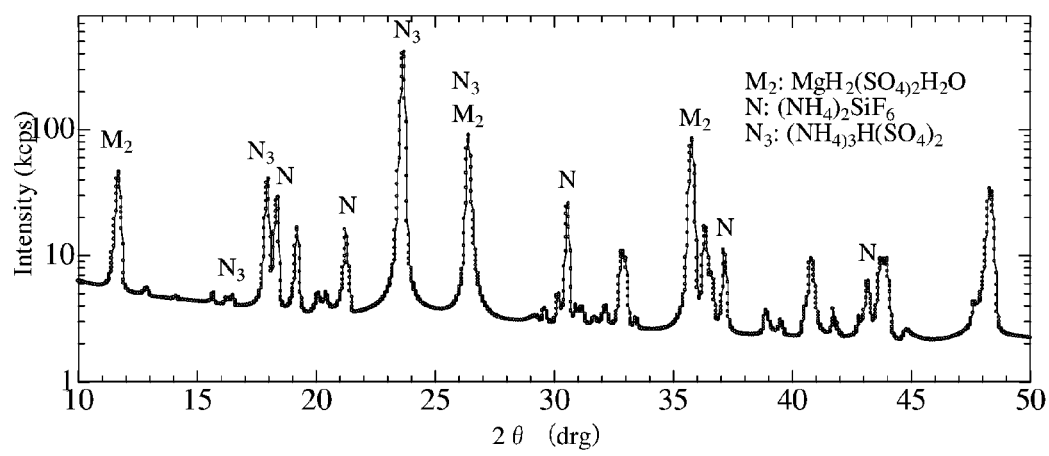
FIG. 19 is a diagram that shows X-Ray diffraction results for a residue of the asbestos treatment agent used in the detoxification in Example 9.

Under the same conditions as in the second experiment mentioned above, a liquid obtained by subjecting the asbestos treatment agent to suction filtration was dried, and the dried solid content (asbestos treatment agent residue) was subjected to X-Ray diffraction analysis. Results of X-Ray diffraction analysis of the asbestos treatment agent residue are shown in FIG. 19. Moreover, the asbestos treatment agent used in Example 9 was analyzed in the present experiment.

As shown in FIG. 19, it was confirmed that the asbestos treatment agent used in Example 9 contained $MgH_2(SO_4)_2 H_2O$ (see "$M_2$" in FIG. 19), $(NH_4)_2SiF_6$ (see "N" in FIG. 19) and $(NH_4)_3H(SO_4)_2$. In addition, the presence of asbestos (crocidolite) was not confirmed in the spent asbestos treatment agent as a result of TEM observations.

Specific examples of the present invention have been explained in detail above, but these are merely examples, and do not limit the scope of the invention. The features disclosed in the claims also encompass modes obtained by variously modifying or altering the specific examples shown above.

According to the present invention, asbestos in asbestos-containing substances can be detoxified more favorably than in the past, and it is possible to greatly contribute to a prevention in adverse effects on humans and the environment by asbestos.

The invention claimed is:

1. A method for detoxifying asbestos, the method comprising:
   preparing an asbestos-containing substance that contains at least one type of asbestos;
   preparing an asbestos treatment agent that contains a mineral acid, N-methyl-2-pyrrolidone and a fluoride; and
   bringing the asbestos-containing substance into contact with the asbestos treatment agent so as to detoxify asbestos in the asbestos-containing substance.

2. The method for detoxifying asbestos according to claim 1, wherein the asbestos-containing substance contains at least one of amosite and crocidolite.

3. The method for detoxifying asbestos according to claim 1, wherein the mineral acid is sulfuric acid.

4. The method for detoxifying asbestos according to claim 1, wherein the asbestos-containing substance is brought into contact with the asbestos treatment agent for a period of 2 hours or longer.

5. The method for detoxifying asbestos according to claim 1, wherein the asbestos treatment agent is heated to a temperature range that is higher than 50° C. and lower than the boiling point of the treatment agent before the asbestos-containing substance is brought into contact with the asbestos treatment agent.

6. The method for detoxifying asbestos according to claim 1, wherein the asbestos-containing substance that is brought into contact with the asbestos treatment agent is in the form of a powder.

7. The method for detoxifying asbestos according to claim 1, wherein the fluoride is a compound selected from the group consisting of a fluoride salt of ammonia, a fluoride salt of alkali metal, a fluoride salt of alkaline earth metal, a hydrofluoric acid of ammonia, a hydrofluoric acid of alkali metal and a hydrofluoric acid of alkaline earth metal.

8. The method for detoxifying asbestos according to claim 1, wherein the concentration of the fluoride is 5 to 25 wt % when the asbestos treatment agent as a whole is taken to be 100 wt %.

9. The method for detoxifying asbestos according to claim 1, wherein the concentration of the N-methyl-2-pyrrolidone is 0.1 to 10 wt % when the asbestos treatment agent as a whole is taken to be 100 wt %.

\* \* \* \* \*